US010222135B2

(12) United States Patent
Owens et al.

(10) Patent No.: US 10,222,135 B2
(45) Date of Patent: Mar. 5, 2019

(54) THERMAL ENERGY STORAGE SYSTEMS

(71) Applicant: Phase Change Energy Solutions, Inc., Asheboro, NC (US)

(72) Inventors: Byron Craig Owens, Asheboro, NC (US); Jeffrey Neal Cox, Asheboro, NC (US); Peter Franz Horwath, Asheboro, NC (US); Reyad I. Sawafta, Greensboro, NC (US)

( * ) Notice: Subject to any disclaimer, the term of this patent is extended or adjusted under 35 U.S.C. 154(b) by 0 days.

(21) Appl. No.: 16/001,637

(22) Filed: Jun. 6, 2018

(65) Prior Publication Data

US 2018/0283800 A1 Oct. 4, 2018

Related U.S. Application Data

(63) Continuation of application No. 14/421,627, filed as application No. PCT/US2013/055735 on Aug. 20, 2013, now Pat. No. 10,012,451.

(60) Provisional application No. 61/691,150, filed on Aug. 20, 2012.

(51) Int. Cl.
| *F28D 17/00* | (2006.01) |
| *F28D 19/00* | (2006.01) |
| *F28D 20/02* | (2006.01) |
| F28D 20/00 | (2006.01) |

(52) U.S. Cl.
CPC ............ *F28D 20/02* (2013.01); *F28D 20/021* (2013.01); *F28D 20/026* (2013.01); F28D 2020/0026 (2013.01); Y02E 60/145 (2013.01)

(58) Field of Classification Search
CPC ...... F28D 20/02; F28D 20/026; F28D 20/021; Y02E 60/145
See application file for complete search history.

(56) References Cited

U.S. PATENT DOCUMENTS

| 2,866,624 | A | * | 12/1958 | Holmquist | .............. F28D 19/04 165/6 |
| 2,933,885 | A | * | 4/1960 | Vago | ......................... F01K 3/00 122/35 |
| 3,889,486 | A | * | 6/1975 | Hinckley | ............... B65D 88/14 220/1.5 |
| 4,259,401 | A | * | 3/1981 | Chahroudi | .............. E04C 1/392 126/618 |
| 4,262,653 | A | * | 4/1981 | Holland | .................. F28D 20/02 126/400 |
| 4,276,752 | A | * | 7/1981 | Modler | .................... F25D 3/125 62/166 |
| 4,329,407 | A | * | 5/1982 | Gross | .................. F28D 15/0275 429/101 |
| 4,473,108 | A | * | 9/1984 | Jansson | ................. F24F 3/1423 165/78 |
| 4,738,303 | A | * | 4/1988 | Lampe | .................... F28D 20/02 126/400 |
| 5,063,748 | A | * | 11/1991 | Davis | .................. F28D 20/0043 62/260 |

(Continued)

*Primary Examiner* — Ljiljana Ciric

(57) ABSTRACT

In one aspect, thermal energy storage systems are described herein. In some embodiments, a thermal energy storage system comprises a thermal energy storage system comprising a container and a heat exchange apparatus disposed within the container. The heat exchange apparatus comprises a tank, a manifold at least partially disposed within the tank, and a phase change material disposed within the tank and in thermal contact with the manifold.

17 Claims, 6 Drawing Sheets

(56) References Cited

U.S. PATENT DOCUMENTS

| | | | | |
|---|---|---|---|---|
| 5,187,945 A * | 2/1993 | Dixon | B60H 1/3232 | 62/234 |
| 5,220,954 A * | 6/1993 | Longardner | F28D 20/021 | 165/10 |
| 5,477,676 A * | 12/1995 | Benson | B64G 1/22 | 60/274 |
| 5,483,799 A * | 1/1996 | Dalto | A61J 1/165 | 62/3.6 |
| 5,603,220 A * | 2/1997 | Seaman | A61J 1/165 | 62/3.62 |
| 5,943,876 A * | 8/1999 | Meyer | C09K 5/066 | 62/371 |
| 5,979,173 A * | 11/1999 | Tyree | F25D 3/125 | 62/385 |
| 6,016,664 A * | 1/2000 | Larsson | B65D 88/745 | 62/406 |
| 6,170,561 B1 * | 1/2001 | O'Grady | C09K 5/063 | 165/10 |
| 6,203,764 B1 * | 3/2001 | Benson | B01D 53/944 | 422/171 |
| 6,226,997 B1 * | 5/2001 | Vago | G08B 21/182 | 340/586 |
| 6,237,361 B1 * | 5/2001 | Broussard | F17C 3/10 | 62/237 |
| 6,244,458 B1 * | 6/2001 | Frysinger | B65D 81/3823 | 220/592.09 |
| 6,308,518 B1 * | 10/2001 | Hunter | F25B 21/02 | 62/3.3 |
| 6,584,797 B1 * | 7/2003 | Smith | C09K 5/047 | 62/371 |
| 6,740,381 B2 * | 5/2004 | Day | B29C 70/086 | 428/56 |
| 6,860,115 B2 * | 3/2005 | Norelius | B65D 88/14 | 62/387 |
| 6,968,711 B2 * | 11/2005 | Smith | C09K 5/047 | 62/371 |
| 7,263,855 B2 * | 9/2007 | Meyer | F25D 11/003 | 62/371 |
| 7,765,831 B2 * | 8/2010 | Rodriguez | F25D 29/003 | 62/210 |
| 7,913,511 B2 * | 3/2011 | Meyer | F25D 11/003 | 62/371 |
| 8,162,542 B2 * | 4/2012 | Harman | B65D 88/14 | 220/1.5 |
| 9,272,811 B1 * | 3/2016 | Ranade | B65D 19/0095 | |
| 9,664,793 B2 * | 5/2017 | Stinson | G01S 5/0027 | |
| 9,873,305 B2 * | 1/2018 | Bank | B60H 1/00492 | |
| 2001/0039802 A1 * | 11/2001 | Barrash | F25B 9/14 | 62/6 |
| 2002/0000306 A1 * | 1/2002 | Bradley | F28D 20/02 | 165/10 |
| 2004/0226309 A1 * | 11/2004 | Broussard | F25D 11/003 | 62/236 |
| 2006/0169436 A1 * | 8/2006 | Ohkura | B41J 2/1752 | 165/4 |
| 2008/0000613 A1 * | 1/2008 | Harpole | F28D 20/0039 | 165/10 |
| 2009/0050591 A1 * | 2/2009 | Hart | G06F 1/182 | 211/162 |
| 2009/0183514 A1 * | 7/2009 | Holmes | F25D 3/125 | 62/51.1 |
| 2009/0199557 A1 * | 8/2009 | Bennett | F01K 3/008 | 60/641.15 |
| 2010/0018667 A1 * | 1/2010 | Khelifa | F28D 1/0478 | 165/10 |
| 2010/0223171 A1 * | 9/2010 | Baller | F24D 19/1048 | 705/34 |
| 2011/0083436 A1 * | 4/2011 | White | F01K 3/08 | 60/670 |
| 2011/0120131 A1 * | 5/2011 | Ostlund | F03G 7/06 | 60/670 |
| 2011/0155343 A1 * | 6/2011 | Boudreau | F24F 12/00 | 165/10 |
| 2011/0290445 A1 * | 12/2011 | Shelef | F28D 20/026 | 165/6 |
| 2012/0031119 A1 * | 2/2012 | Ahmad | B64B 1/50 | 62/79 |
| 2012/0111386 A1 * | 5/2012 | Bell | H01L 35/00 | 136/205 |
| 2012/0118526 A1 * | 5/2012 | Sudau | B22D 11/00 | 165/7 |
| 2012/0227926 A1 * | 9/2012 | Field | F24D 11/003 | 165/10 |
| 2012/0255706 A1 * | 10/2012 | Tadayon | F28D 20/0039 | 165/47 |
| 2012/0297772 A1 * | 11/2012 | McBride | F01B 23/00 | 60/649 |
| 2013/0008188 A1 * | 1/2013 | McCormick | F28D 15/0275 | 62/53.2 |
| 2013/0008631 A1 * | 1/2013 | Newman | F28D 15/0275 | 165/104.26 |
| 2013/0153169 A1 * | 6/2013 | Perryman | F28D 20/021 | 165/10 |
| 2013/0220306 A1 * | 8/2013 | Haider | F28C 3/16 | 126/620 |
| 2013/0283827 A1 * | 10/2013 | Wang | F25B 49/022 | 62/61 |
| 2013/0306656 A1 * | 11/2013 | Eckhoff | F25D 3/125 | 220/592.26 |
| 2014/0008042 A1 * | 1/2014 | Schryver | F25D 3/08 | 165/104.19 |
| 2014/0102662 A1 * | 4/2014 | Grama | C09K 5/063 | 165/10 |
| 2014/0352801 A1 * | 12/2014 | McAlister | B60K 15/035 | 137/312 |
| 2015/0204618 A1 * | 7/2015 | Owens | F28D 20/021 | 165/10 |
| 2016/0146507 A1 * | 5/2016 | Johnson | C02F 1/14 | 126/714 |
| 2016/0363387 A1 * | 12/2016 | Stapleton | F28D 20/021 | |
| 2017/0205152 A1 * | 7/2017 | Grama | C09K 5/063 | |
| 2018/0003445 A1 * | 1/2018 | Bergan | F28D 20/00 | |

* cited by examiner

THERMAL ENERGY STORAGE SYSTEMS

CROSS REFERENCE TO RELATED APPLICATIONS

This application is a continuation of U.S. application Ser. No. 14/421,627, filed on Feb. 13, 2015, which is the national stage application under 35 U.S.C. § 371 of International Application No. PCT/US2013/055735, filed Aug. 20, 2013, which claims priority pursuant to 35 U.S.C. § 119(e) to U.S. Provisional Patent Application Ser. No. 61/691,150, filed on Aug. 20, 2012, each of which is hereby incorporated by reference in its entirety.

FIELD

The present invention relates to thermal energy storage systems and applications thereof.

BACKGROUND

The production of electricity is generally more expensive during peak demand hours than at low demand hours. Therefore, various energy storage systems have been developed which permit the storage of energy for later use. In particular, thermal energy storage systems permit thermal energy to be generated during off-peak periods and stored for use during subsequent on-peak periods. Such deferred use of stored energy can reduce strain on the power grid and/or reduce the average cost of energy per kilowatt-hour during peak load periods. However, some previous thermal energy storage systems suffer from one or more disadvantages, such as short thermal energy storage periods, low capacity, low efficiency, low versatility, and difficulty of installation. Improved thermal energy storage systems are therefore desired.

SUMMARY

In one aspect, thermal energy storage systems are described herein which, in some embodiments, may offer one or more advantages over prior thermal energy storage systems. In some embodiments, for example, a thermal energy storage system described herein is a self-contained system that can be shipped and installed easily and inexpensively. A thermal energy storage system described herein, in some cases, can also be installed without the need to add or replace other systems or components used in conjunction with the thermal energy storage system. For example, a thermal energy storage system described herein can be used to "retrofit" a building's HVAC system without the need to add new chillers or replace existing chillers. Further, in some embodiments, a thermal energy storage system described herein is modular, portable, and stackable. Moreover, in some embodiments, a thermal energy storage system described herein can provide a variable flow rate, thereby improving versatility and efficiency. In addition, in some embodiments, a thermal energy storage system described herein comprises an efficient, environmentally-friendly phase change material (PCM) having a high thermal energy storage capacity.

A thermal energy storage system described herein, in some embodiments, comprises a container and a heat exchange apparatus disposed within the container. The heat exchange apparatus comprises a tank, a manifold at least partially disposed within the tank, and a phase change material (PCM) disposed within the tank and in thermal contact with the manifold. The manifold is at least partially formed from a thermally conductive material. In some embodiments, the system further comprises a thermally insulating material disposed within the container and surrounding the exterior of the tank. Moreover, in some embodiments, the manifold of a system described herein selectively provides a plurality of differing flow paths for a fluid within the manifold. The container, in some embodiments, comprises a standard shipping container.

These and other embodiments are described in greater detail in the description which follows.

DETAILED DESCRIPTION

Figure 1:
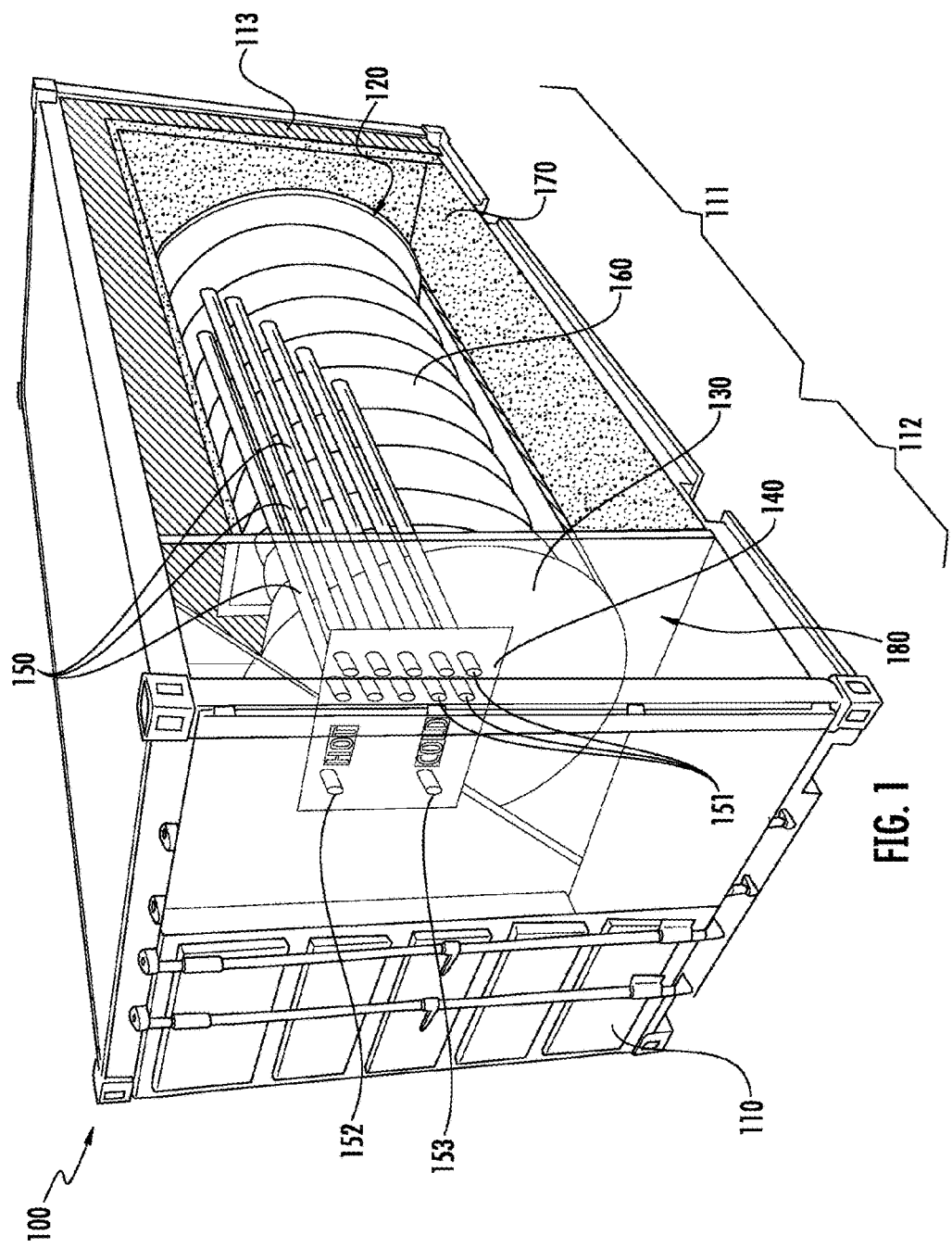
FIG. 1 illustrates a cut away perspective view of a thermal energy storage system according to one embodiment described herein.

Embodiments described herein can be understood more readily by reference to the following detailed description, drawings, and examples. Elements, apparatus, and methods described herein, however, are not limited to the specific embodiments presented in the detailed description, drawings, and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In addition, when the term "substantially" is used to describe a degree of completeness, it is to be understood that the completeness is at least about 80 percent, at least about 90 percent, at least about 95 percent, or at least about 99 percent. For example, a first component that "substantially surrounds" a second component can surround at least about 80 percent, at least about 90 percent, at least about 95 percent, or at least about 99 percent of the exterior of the second component.

In one aspect, thermal energy storage systems are described herein. In some embodiments, a thermal energy storage system comprises a container and a heat exchange apparatus disposed within the container. The heat exchange apparatus comprises a tank, a manifold at least partially disposed within the tank, and a phase change material (PCM) disposed within the tank and in thermal contact with the manifold. A "manifold," for reference purposes herein, comprises one or more chambers or pipes adapted to receive, distribute, transport, and/or discharge a fluid. Additionally, two components in "thermal contact" with one another, for reference purposes herein, are able to exchange energy with one another through the thermodynamic process of heating with a thermal efficiency of at least about 80 percent, at least about 90 percent, or at least about 95 percent.

Moreover, in some embodiments, a manifold of the heat exchange apparatus contains a fluid used for thermal energy transfer, such as a thermal fluid. In addition, in some embodiments, the manifold selectively provides a plurality of differing flow paths for the fluid within the manifold. The plurality of differing flow paths, in some embodiments, have different lengths and/or residence times of the fluid within the tank, such that a fluid flowing in the manifold can be in thermal contact with the PCM disposed in the tank for a variable period of time, as desired by the user. The flow path and/or residence time of a fluid within the tank, in some embodiments, can be selected by choosing one of a plurality of possible pipe segments of the manifold for transport of the fluid, as described further hereinbelow. In addition, in some embodiments, a manifold further comprises one or more connectors for interfacing with an external system, such as an external HVAC system. The connectors, in some embodiments, comprise one or more inlets or outlets for receiving or providing a heated or cooled fluid from or to an external system. Thus, a thermal energy storage system described herein, in some instances, can have a configuration suitable for use with a wide variety of types or models of external systems, such as HVAC systems or chillers, without the need to remove, replace, or upgrade the external systems to complete a retrofitting operation.

In addition, in some embodiments, a system described herein further comprises a thermally insulating material disposed within the interior of the container and surrounding the exterior of the tank.

Further, in some embodiments, a thermal energy storage system described herein also comprises an energy-producing apparatus, such as a photovoltaic apparatus, thermal-solar apparatus, or geothermal apparatus. The energy-producing apparatus can be adapted to provide electrical and/or thermal energy to another component of the system. Therefore, use of such an energy-producing apparatus, in some embodiments, can further improve the efficiency and/or environmental friendliness of the thermal energy storage system. For instance, in some cases, an energy-producing apparatus provides at least a portion of the energy needed to produce a phase transition in a PCM of the heat exchange apparatus. In other embodiments, the energy-producing apparatus provides energy to a battery or an external power grid to at least partially offset the energy consumed by operation of the thermal energy storage system.

FIG. 1 illustrates a cut away perspective view of a thermal energy storage system according to one embodiment described herein. The system (100) illustrated in FIG. 1 comprises a container (110) and a heat exchange apparatus (120). The heat exchange apparatus (120) comprises a tank (130), a manifold (140) partially disposed in the tank (130), and a PCM (not shown) disposed in the tank (130) and in thermal contact with the manifold (140). As illustrated in FIG. 1, both the container (110) and the tank (130) are depicted as partially cut away to facilitate understanding of the structure and arrangement of components of the system (100).

In the embodiment of FIG. 1, the manifold (140) comprises a plurality of pipe segments (150) coupled to a plurality of thermal transfer discs (160). The thermal transfer discs (160) are disposed within the interior volume of the tank (130), while the pipe segments (150) are partially disposed within the interior volume of the tank (130). Ends (151) of the pipe segments (150) extend beyond the interior volume of the tank (130), providing access to the manifold (140) by a user. The PCM occupies a continuous interior volume of the tank (130) around the manifold (140). Approximately 70 percent of the interior volume of the tank (130) is occupied by the PCM, while the remaining 30 percent is occupied by the manifold (140). Other distributions of tank volume are also possible. For example, in some instances, the PCM occupies about 50 volume percent to about 90 volume percent, and the manifold occupies about 10 volume percent to about 50 volume percent, based on the total interior volume of the tank. The manifold (140) contains a fluid (not shown) used for thermal energy transfer, such as a thermal fluid.

The thermal energy storage system of FIG. 1 also comprises a thermally insulating material (170) disposed within the container (110) and surrounding the tank (130) completely or substantially completely. The thermally insulating material (170) is represented schematically in FIG. 1 as a box-like material surrounding the tank (130). However, this depiction is for illustration purposes only. The thermally insulating material (170) can comprise thermally insulating panels or an amorphous material such as blown insulation or foam insulation. In addition, the thermally insulating material (170) can be blown, sprayed, or otherwise disposed in the container (110) before and/or after the heat exchange apparatus (120) is disposed in the container (110).

Further, the thermal energy storage system (100) also comprises a divider wall (180) separating an active interior region (111) of the container (110) from a user-accessible interior region (112) of the container (110). As illustrated in FIG. 1, the divider wall (180) is depicted as partially cutaway and partially transparent to facilitate understanding of the structure and arrangement of the components of the system (100). The active interior region (111) substantially contains the heat exchange apparatus (120), while the user-accessible region (112) provides access to the manifold (140) via the pipe ends (151) and inlet (152) and outlet (153) connectors passing through the divider wall (180).

The system (100) also comprises an outer lining (113) surrounding the active interior region (111) of the container (110). The outer lining (113) comprises or is formed from a second PCM that, as appropriate for the climate, resists heating or cooling of the heat exchange apparatus (120) within the active interior region (111). As illustrated in FIG. 1, the outer lining (113) surrounds the exterior of the tank (130) on three sides. However, it is also possible for an outer lining described herein to surround the exterior of a tank on all four sides or on fewer than three sides. An outer lining can also be a continuous or substantially continuous lining, as opposed to a partial, grid-like, or mesh-like lining. If desired, an outer lining can also surround the user-accessible interior region of a container described herein.

Figure 2:
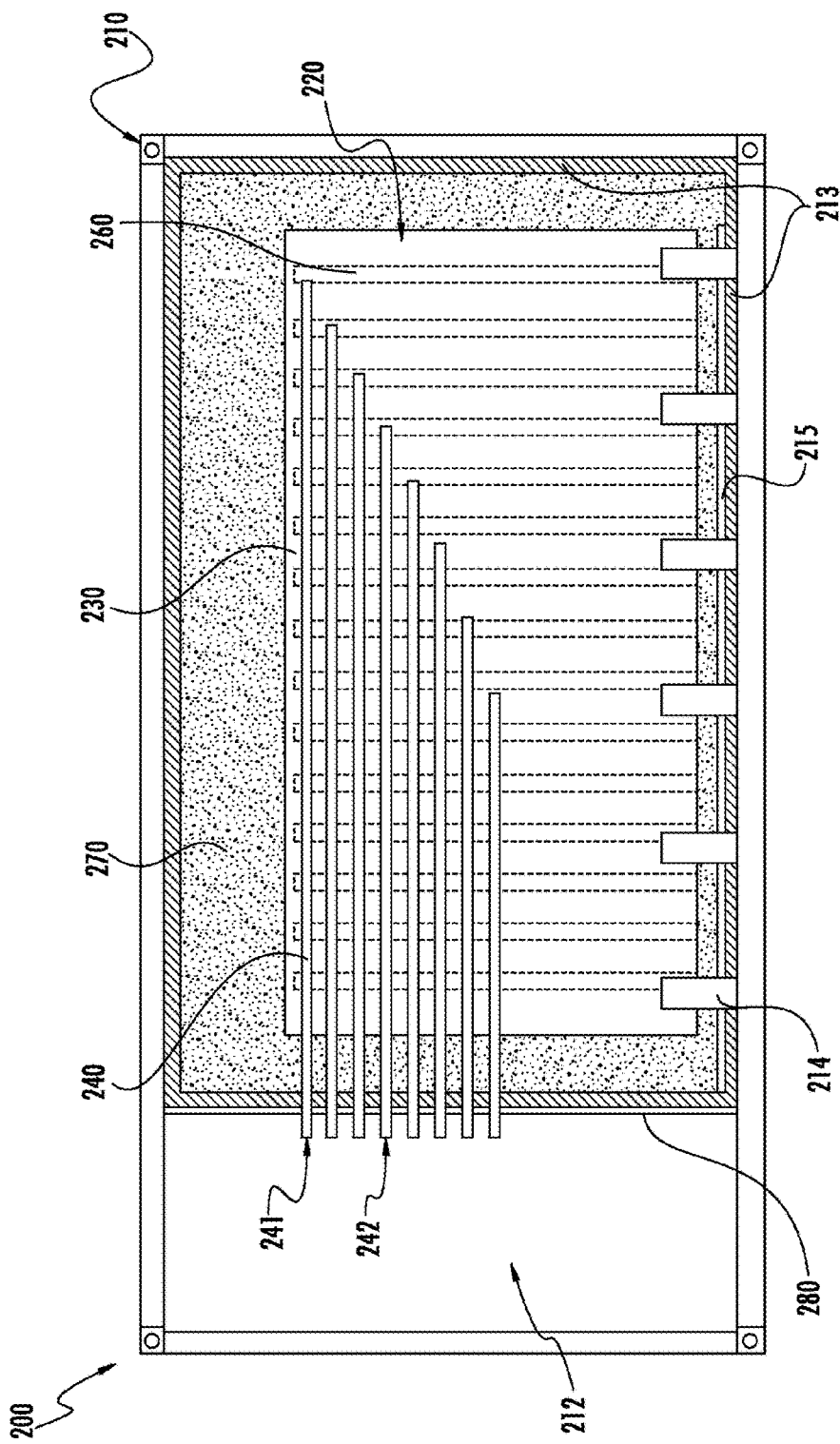
FIG. 2 illustrates a sectional view of the side of a thermal energy storage system according to one embodiment described herein.

FIG. 2 illustrates a side cross sectional view of a thermal energy storage system (200) according to another embodiment described herein. The embodiment of FIG. 2 has a construction similar to that of the embodiment of FIG. 1. However, the container (210) of the system (200) further comprises non-thermally conducting tank supports (214) and a slide-out rail system (215). The tank supports (214) permit the tank (230) to be supported above the floor of the container (210). The rail system (215) permits the tank (230) to be moved within the container (210), facilitating access, replacement, or repair of various components of the system (200). As illustrated in FIG. 2, the rail system (215) permits the tank (230) to be moved back and forth along the long axis of the container (210), between the front end (on the left of FIG. 2) and the back end (on the right of FIG. 2).

As described hereinabove, the flow path and/or residence time of a fluid within the tank of a thermal energy storage system described herein, in some embodiments, can be varied as desired by a user. In some cases, the flow path and/or residence time of a fluid within the tank is selected by choosing one of a plurality of possible pipe segments of a manifold. For example, with reference to FIG. 2, choosing a first pipe segment (241) of the manifold (240) can provide a first flow path and choosing a second pipe segment (242) of the manifold (240) can provide a second flow path. In some cases, the second flow path can be shorter than the first flow path.

A thermal energy storage system described herein can be used to store thermal energy or to provide or remove thermal energy to or from an external environment. For example, in some embodiments, a system described herein can be used to provide heating or cooling to an external environment such as a building or room, including in a reversible manner. In some cases, for example, a building or room has a separate heating, ventilation, and air conditioning (HVAC) system external to the thermal energy storage system, and the external HVAC system is supplemented or assisted by the thermal energy storage system. For instance, with reference to FIGS. 1 and 2, an external HVAC system (not shown) of a building (not shown) can provide energy needed to heat (or cool) the PCM, such as by providing heated (or cooled) fluid to the input connector (152) of the manifold (140, 240) of the heat exchange apparatus (120, 220). The energy needed for heating (or cooling), in some embodiments, is provided by the external system during an off-peak period when electricity generation is less expensive and/or creates a reduced strain on the power grid. Further, in some embodiments, the thermal energy transfer between the heated (or cooled) fluid and the PCM effects a phase transition in the PCM. Moreover, due to the thermal insulation provided by one or more of the thermally insulating material (170, 270), the outer lining (113, 213), and the tank supports (214), the PCM, in some embodiments, remains in the desired phase or substantially in the desired phase and/or at or near a desired temperature for a substantial period of time following the phase change and prior to the subsequent use of the thermal energy stored in the PCM in this manner. Later, during a peak load period, the PCM can then provide cooling (or heating) to a fluid in the manifold through thermal energy transfer carried out in the opposite direction as previously. The cooled (or heated) fluid can then be provided to the external system through the outlet (153) of the heat exchange apparatus (120, 220). The cooled (or heated) fluid can then be used by the external system, thereby reducing the energy the external system must draw from the power grid or other energy source during peak load periods. Moreover, in some embodiments, the efficiency and/or environmental friendliness of the operation of a system described herein is further increased by the use of an energy-producing apparatus as described herein.

Therefore, in another aspect, methods of storing thermal energy are described herein. In some embodiments, a method of storing thermal energy comprises providing a heated (or cooled) fluid to a manifold in thermal contact with a PCM; transferring thermal energy between the heated (or cooled) fluid and the PCM to effect a first phase change of the PCM and to cool the heated fluid (or heat the cooled fluid). In this manner, thermal energy can be transferred between the PCM and the heated (or cooled) fluid and "stored" for later use. Thus, a method described herein can further comprise providing a cooled (or heated) fluid to the manifold and transferring thermal energy between the cooled (or heated) fluid and the PCM to effect a second phase change of the PCM and to heat the cooled fluid (or cool the heated fluid). In some embodiments, the first and second phase changes can be in opposite directions. For example, in some cases, the first phase change is a solid-to-liquid phase change and the second phase change is a liquid-to-solid phase change. Further, in some embodiments, the first phase change is accomplished at a time of relatively low energy demand (such as an off-peak time), and the second phase change is accomplished at a time of relatively high energy demand (such as a peak time). Moreover, it is to be understood that the manifold and PCM of a method described herein can comprise a manifold and PCM of a thermal energy storage system described herein, such that the method is carried out using the thermal energy storage system.

In addition, a thermal energy storage system described herein, in some embodiments, can be used for applications other than climate control applications. For example, in some embodiments, a thermal energy storage system described herein can be used in industrial applications, such as for cooling circulating water used in plastic making (such as in injection molding applications) or for absorbing excess heat generated from exothermic reactions in production processes (such as in foam production applications). In some embodiments, a thermal energy storage system described herein provides both a reduction in the volume of water used and also a rapid turnaround time for cooling the water.

Figure 3:
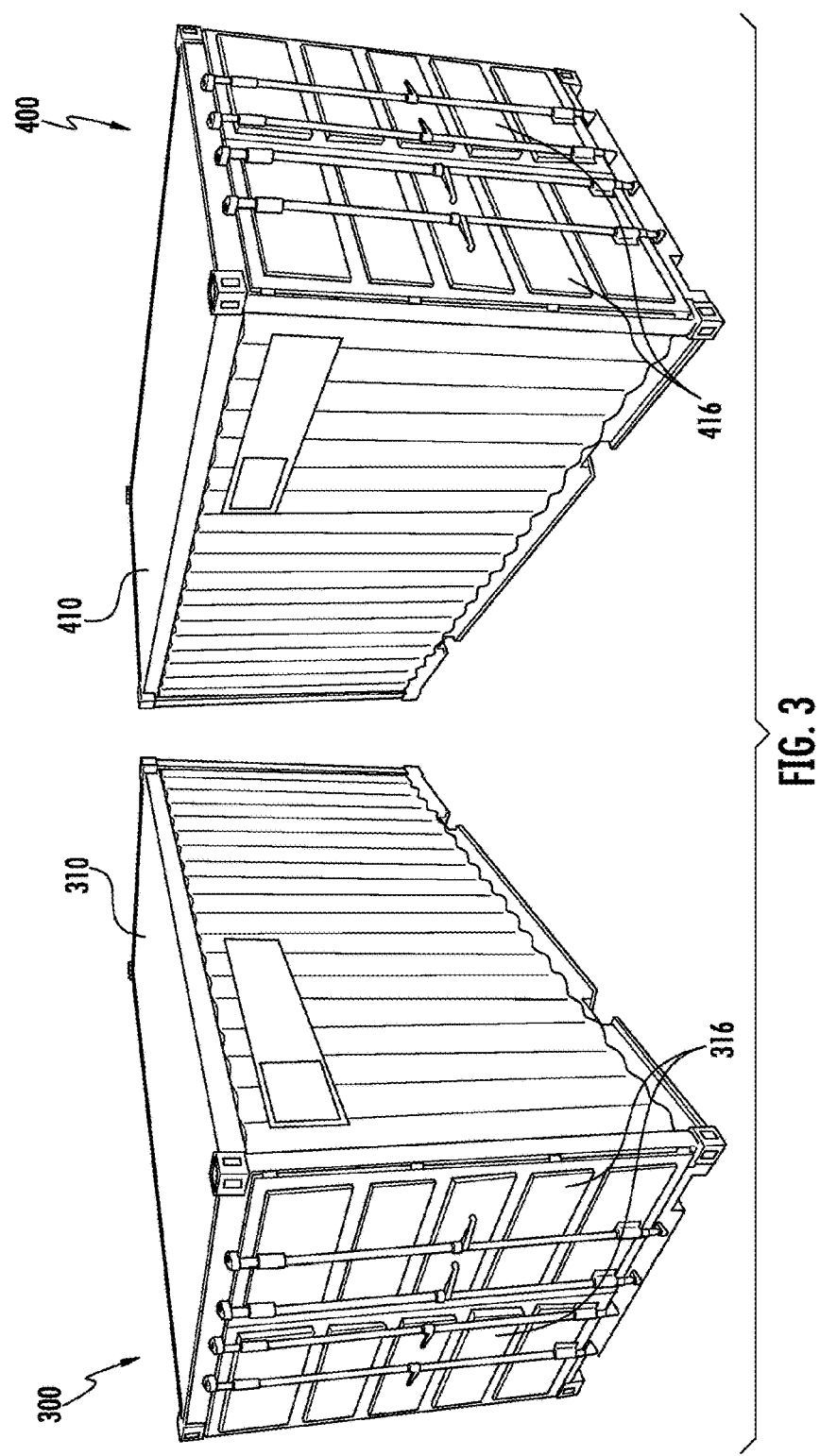
FIG. 3 illustrates a perspective view of the exteriors of a plurality of thermal energy storage systems according to some embodiments described herein.
Figure 4:
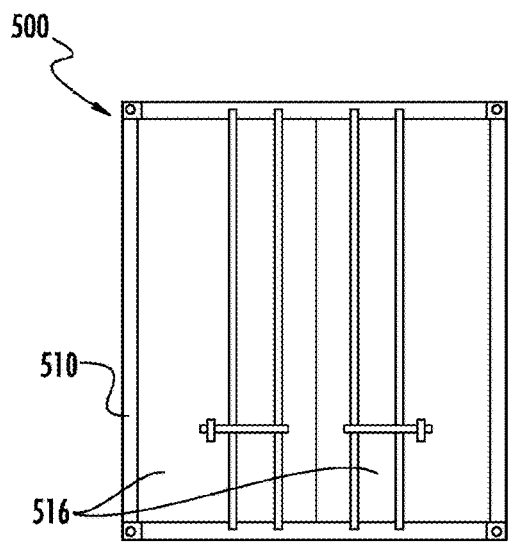
FIG. 4 illustrates a rear view of the exterior of a thermal energy storage system according to one embodiment described herein.
Figure 5:
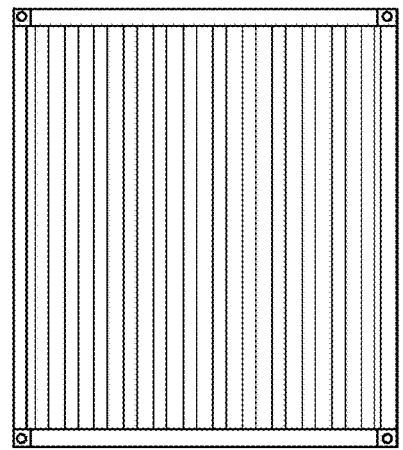
FIG. 5 illustrates a front view of the exterior of the thermal energy storage system of FIG. 4.
Figure 6:
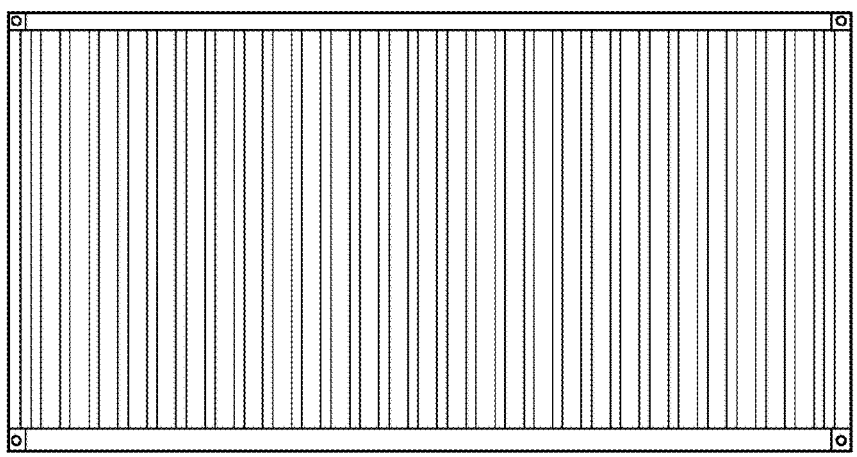
FIG. 6 illustrates a side view of the exterior of the thermal energy storage system of FIG. 4.
Figure 7:
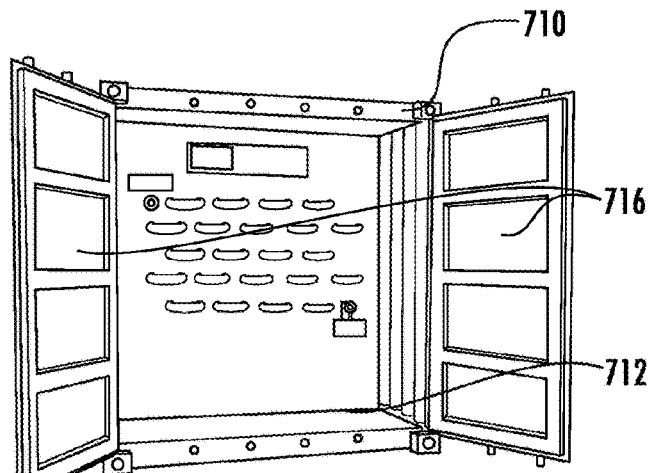
FIG. 7 illustrates a perspective view of the exterior of the rear of an open thermal energy storage system according to one embodiment described herein.
Figure 8:
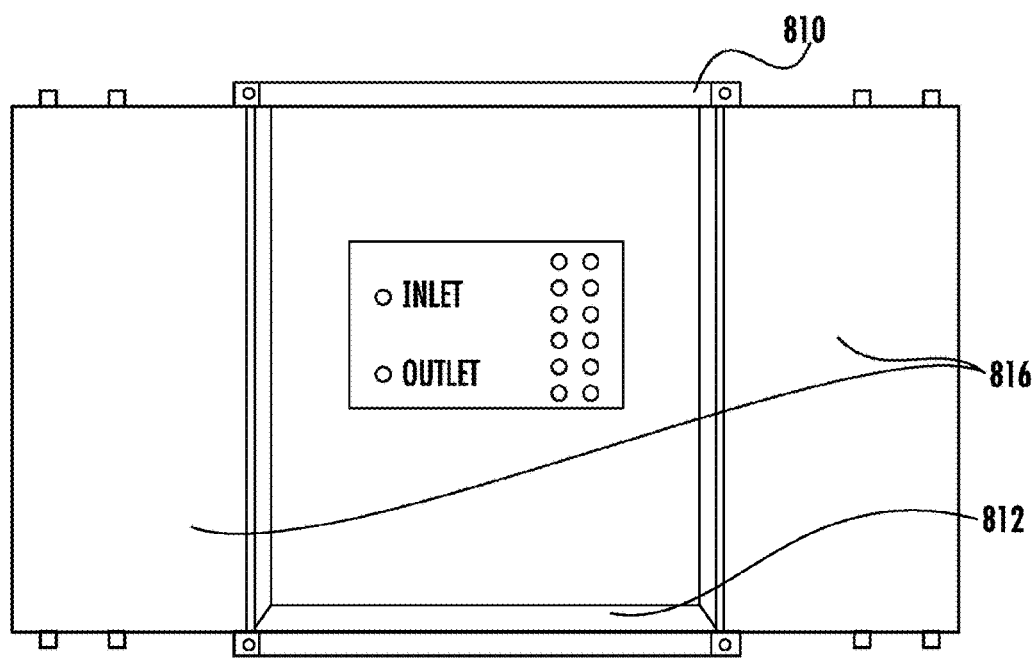
FIG. 8 illustrates a rear view of the exterior of an open thermal energy storage system according to one embodiment described herein.

FIG. 3 illustrates a perspective view of the exteriors of two thermal energy storage systems (300, 400) described herein. FIG. 4 illustrates a rear view of the exterior of another thermal energy storage system (500) described herein. FIG. 5 illustrates a front view of the exterior of the thermal energy storage system of FIG. 4, and FIG. 6 illustrates a side view of the exterior of the thermal energy storage system of FIG. 4. As shown in FIGS. 3-6, in some embodiments, the container (310, 410, 510) of a thermal energy storage system (300, 400, 500) contains or substantially contains all of the other components of the system, including the heat exchange apparatus. Therefore, in some embodiments, a thermal energy storage system described herein is self-contained and can have the overall size and shape of the container (310, 410, 510). Moreover, the container, in some embodiments, comprises a standard shipping container such as a standard shipping container used in water freight and/or ground freight transport. Thus, in some embodiments, the size and shape of the container of a thermal energy storage system described herein facilitates convenient and inexpensive installation and transportation of the system, including international transportation. In addition, with reference to FIGS. 3, 4, 7 and 8, in some embodiments, the container (310, 410, 510, 710, 810) comprises access doors (316, 416, 516, 716, 816). As illustrated in FIGS. 7 and 8, the access doors (716, 816), in some embodiments, provide access to the user-accessible interior region (712, 812) of the container (710, 810). FIG. 7 illustrates a perspective view of the exterior of an open thermal energy storage system, and FIG. 8 illustrates a rear view of the exterior of an open thermal energy storage system.

Figure 11:
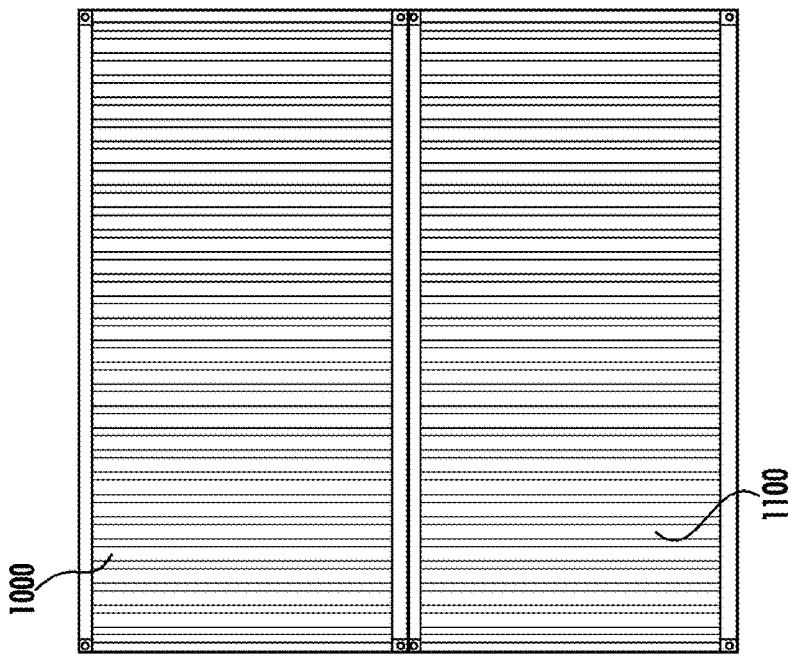
FIG. 11 illustrates a side view of the stacked thermal energy storage systems of FIG. 10.
Figure 10:
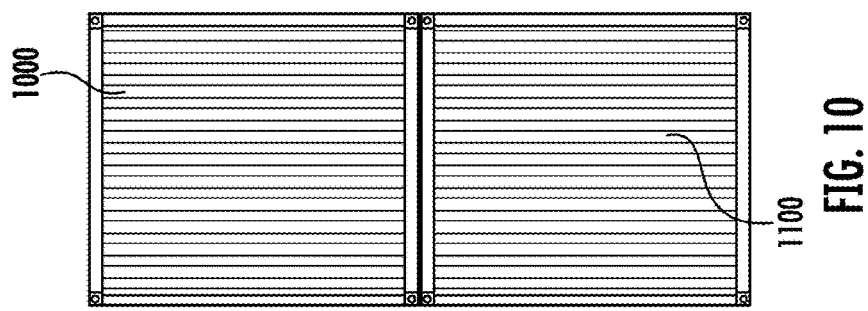
FIG. 10 illustrates a front view of two stacked thermal energy storage systems according to one embodiment described herein.
Figure 9:
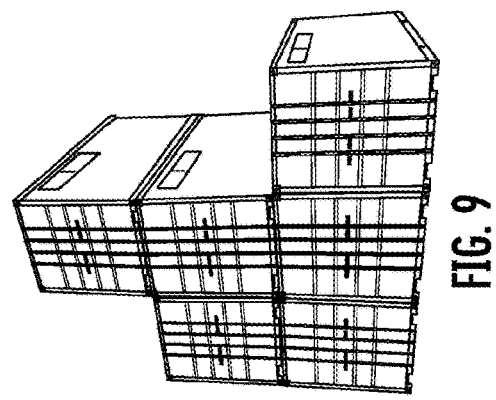
FIG. 9 illustrates a perspective view of a plurality of stacked thermal energy storage systems according to one embodiment described herein.

Further, in some embodiments, a thermal energy storage system described herein exhibits a small footprint and/or is stackable, as illustrated in FIGS. 9-11. FIG. 9 illustrates a perspective view of a plurality of stacked thermal energy storage systems described herein. FIG. 10 illustrates a front view of two stacked thermal energy storage systems (1000, 1100), and FIG. 11 illustrates a side view of the stacked thermal energy storage systems of FIG. 10.

Turning now to specific components of thermal energy storage systems, thermal energy storage systems described herein comprise a container. Any container not inconsistent with the objectives of the present invention may be used. For example, in some embodiments, the container comprises a shipping container such as a standard shipping container, as described hereinabove. A standard shipping container, in some embodiments, comprises a container approved by the Department of Transportation for shipping, including a container having exterior dimensions of 20 feet by 8 feet by 8 feet. Further, a container for use in a thermal energy storage system described herein, in some embodiments, can have other dimensions. The size and shape of a container, in some embodiments, are selected based on one or more of a desired thermal energy storage capacity of the system, a desired footprint of the system, and a desired stackability or portability of the system. Similarly, the container of a thermal energy storage system described herein can be formed of any material not inconsistent with the objectives of the present invention. In some embodiments, for example, the container is made from weather-resistant materials, thereby permitting shipment and installation of the system in an outdoor environment. In some embodiments, the container is metal, such as iron or steel.

In addition, in some embodiments, a container of a thermal energy storage system described herein comprises a divider wall separating a user-accessible region of the container from an active region of the container. Any divider wall not inconsistent with the objectives of the present invention may be used. In some embodiments, for example, the divider wall is thermally insulating rather than thermally conductive. A "thermally insulating" divider wall, for reference purposes herein, is more insulating than conductive at temperatures encountered during normal use of the thermal energy storage system, such as between about −40° C. and about 90° C. Further, in some embodiments, the divider wall is permanently disposed in the container, such as by welding. In other embodiments, the divider wall is movable or removable, thereby facilitating movement of the heat exchange apparatus within the container and/or replacement or repair of various components of the thermal energy storage system.

In some embodiments, the container of a thermal energy storage system described herein further comprises one or more tank supports. Any tank supports not inconsistent with the objectives of the present invention may be used. For example, in some embodiments, a tank support is formed from a thermally insulating material. A "thermally insulating" material, for reference purposes herein, is more insulating than conductive at temperatures encountered during normal use of the thermal energy storage system, such as between about −40° C. and about 90° C.

In addition, in some embodiments, the container further comprises a slide out rail system. Any rail system not inconsistent with the objectives of the present invention may be used. In some embodiments, for instance, a rail system comprises at least two rails disposed on opposing sides of the container and adapted to permit movement of the tank of the system along the rails.

Moreover, in some embodiments, a container of a thermal energy storage system described herein comprises an outer lining comprising a PCM. Any outer lining not inconsistent with the objectives of the present invention may be used. In some embodiments, for instance, the PCM of the outer lining comprises a PCM described hereinbelow. The identity of the PCM can be selected, in some embodiments, based on the climate or season in which the thermal energy storage system is used. For example, for use in cold weather, a PCM of the outer lining can be selected to provide resistance to cooling of the heat exchange apparatus by outside air. For use in warm weather, a PCM of the outer lining can be selected to provide resistance to heating of the heat exchange apparatus by outside air.

A thermal energy storage system described herein also comprises a heat exchange apparatus comprising a tank. Any tank not inconsistent with the objectives of the present invention may be used. Moreover, a tank can have any size and be formed of any material not inconsistent with the objectives of the present invention. In some embodiments, for example, a tank is formed from metal such as stainless steel. In other embodiments, a tank is formed from a composite material such as a fiber glass composite material. Further, in some embodiments, the heat exchange apparatus comprises only one tank.

The heat exchange apparatus of a thermal energy storage system described herein also comprises a manifold partially disposed in the tank. Any manifold not inconsistent with the objectives of the present invention may be used. In some embodiments, for example, the manifold is at least partially constructed of a thermally conductive material such as metal. A "thermally conductive" material, for reference purposes herein, is more conductive than insulating at temperatures encountered during normal use of the thermal energy storage system, such as between about −40° C. and about 90° C. In some embodiments, the manifold comprises one or more pipe segments and/or thermal transfer discs or plates. The pipe segments and/or thermal transfer discs can be coupled to each other and arranged in any manner not inconsistent with the objectives of the present invention. For instance, in some embodiments, the manifold includes a "plate heat exchanger" construction. In other embodiments, the manifold includes a "plate-fin heat exchanger" construction. Further, in some embodiments, the components of the manifold are adapted to selectively provide a plurality of flow paths for a fluid within the manifold, as described further above. Therefore, in some embodiments, a manifold of a heat exchange apparatus described herein can selectively provide a flow rate ranging from about 1 gallon per minute (GPM) to about 200 GPM or from about 10 GPM to about 100 GPM.

In some embodiments, a manifold of a heat exchange apparatus described herein contains a fluid. Any fluid not inconsistent with the objectives of the present invention may be used. In some embodiments, for instance, the fluid comprises a thermal fluid. For reference purposes herein, a thermal fluid can be a fluid having a high heat capacity. In some embodiments, a thermal fluid also exhibits high thermal conductivity. Moreover, the fluid within a manifold described herein can be a liquid or a gas. A liquid fluid, in some embodiments, comprises a glycol, such as ethylene glycol, propylene glycol, hexylene glycol, and/or polyalkylene glycol. In some embodiments, the liquid fluid comprises water or consists essentially of water. In some cases, a gas fluid comprises or consists essentially of air.

In addition, a manifold of a heat exchange apparatus described herein, in some embodiments, further comprises one or more connectors for interfacing with an external system. Any connectors not inconsistent with the objectives of the present invention may be used. In some embodiments, for instance, a connector comprises a "quick connect" plumbing connector. For example, in some embodiments, the manifold comprises a quick connect inlet connector and a quick connect outlet connector, thereby facilitating convenient installation of a thermal energy storage system described herein, wherein the installation can be reversible or permanent, as desired by the user. Moreover, the use of convenient and reversible connectors to external systems, in some embodiments, permits a plurality of thermal energy storage systems described herein to be used cooperatively. For example, in some embodiments, a first thermal energy storage system described herein adapted to provide cooling during warm weather can be used cooperatively with a second thermal energy storage system adapted to provide heating during cool weather. In some embodiments, switching from the use of one system to the other system according to the weather or season can be carried out in a convenient and simple manner, including through the use of a reversible connector described herein.

Heat exchange apparatus of thermal energy storage systems described herein also comprise a PCM disposed in the tank of the heat exchange apparatus. Any PCM not inconsistent with the objectives of the present invention may be used. Further, a PCM of a heat exchange apparatus described herein, in some embodiments, can either absorb or release energy using a phase transition. Therefore, in some embodiments, a thermal energy storage system described herein can be selectively adapted for heating or cooling applications based on the choice of PCM. In some embodiments, for instance, a PCM is adapted for on-peak heating applications. Alternatively, in other embodiments, a PCM is adapted for on-peak cooling applications. A PCM adapted for on-peak cooling applications, in some embodiments, exhibits a relatively low phase transition temperature, such as a phase transition temperature between about −20° C. and about 20° C. or between about 0° C. and about 20° C. A PCM adapted for on-peak heating applications, in some embodiments, exhibits a relatively high phase transition temperature, such as a phase transition temperature between about 37° C. and about 90° C. or between about 50° C. and about 70° C.

In addition, a PCM of a heat exchange apparatus described herein can have any composition not inconsistent with the objectives of the present invention. In some embodiments, for instance, a PCM comprises an inorganic composition. In other embodiments, a PCM comprises an organic composition. In some embodiments, a PCM comprises a salt hydrate. Suitable salt hydrates include, without limitation $Ca(NO_3)_2 \cdot 3H_2O$, $Na(NO_3)_2 \cdot 6H_2O$, $Zn(NO_3)_2 \cdot 2H_2O$, $FeCl_3 \cdot 2H_2O$, $Co(NO_3)_2 \cdot 6H_2O$, $Ni(NO_3)_2 \cdot 6H_2O$, $MnCl_2 \cdot 4H_2O$, $CH_3COONa \cdot 3H_2O$, $LiC_2H_3O_2 \cdot 2H_2O$, $MgCl_2 \cdot 4H_2O$, $NaOH \cdot H_2O$, $Cd(NO_3)_2 \cdot 4H_2O$, $Cd(NO_3)_2 \cdot 1H_2O$, $Fe(NO_3)_2 \cdot 6H_2O$, $NaAl(SO_4)_2 \cdot 12H_2O$, $FeSO_4 \cdot 7H_2O$, $Na_3PO_4 \cdot 12H_2O$, $Na_2B_4O_7 \cdot 10H_2O$, $Na_3PO_4 \cdot 12H_2O$, $LiCH_3COO \cdot 2H_2O$, and/or mixtures thereof.

In other embodiments, a PCM comprises a fatty acid. A fatty acid, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty acids suitable for use in some embodiments described herein include caprylic acid, capric acid, lauric acid, myristic acid, palmitic acid, stearic acid, arachidic acid, behenic acid, lignoceric acid, and cerotic acid. In some embodiments, a PCM described herein comprises a combination, mixture, or plurality of differing fatty acids.

In some embodiments, a PCM comprises an alkyl ester of a fatty acid. Any alkyl ester not inconsistent with the objectives of the present invention may be used. For instance, in some embodiments, an alkyl ester comprises a methyl ester, ethyl ester, isopropyl ester, butyl ester, or hexyl ester of a fatty acid described herein. In other embodiments, an alkyl ester comprises a C2 to C6 ester alkyl backbone or a C6 to C12 ester alkyl backbone. In some embodiments, an alkyl ester comprises a C12 to C28 ester alkyl backbone. Further, in some embodiments, a PCM comprises a combination, mixture, or plurality of differing alkyl esters of fatty acids. Non-limiting examples of alkyl esters of fatty acids suitable for use in some embodiments described herein include methyl laurate, methyl myristate, methyl palmitate, methyl stearate, methyl palmitoleate, methyl oleate, methyl linoleate, methyl docosahexanoate, methyl ecosapentanoate, ethyl laurate, ethyl myristate, ethyl palmitate, ethyl stearate, ethyl palmitoleate, ethyl oleate, ethyl linoleate, ethyl docosahexanoate, ethyl ecosapentanoate, isopropyl laurate, isopropyl myristate, isopropyl palmitate, isopropyl stearate, isopropyl palmitoleate, isopropyl oleate, isopropyl linoleate, isopropyl docosahexanoate, isopropyl ecosapentanoate, butyl laurate, butyl myristate, butyl palmitate, butyl stearate, butyl palmitoleate, butyl oleate, butyl linoleate, butyl docosahexanoate, butyl ecosapentanoate, hexyl laurate, hexyl myristate, hexyl palmitate, hexyl stearate, hexyl palmitoleate, hexyl oleate, hexyl linoleate, hexyl docosahexanoate, and hexyl ecosapentanoate.

In some embodiments, a PCM comprises a fatty alcohol. Any fatty alcohol not inconsistent with the objectives of the present invention may be used. For instance, a fatty alcohol, in some embodiments, can have a C4 to C28 aliphatic hydrocarbon tail. Further, in some embodiments, the hydrocarbon tail is saturated. Alternatively, in other embodiments, the hydrocarbon tail is unsaturated. In some embodiments, the hydrocarbon tail can be branched or linear. Non-limiting examples of fatty alcohols suitable for use in some embodiments described herein include capryl alcohol, pelargonic alcohol, capric alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol, arachidyl alcohol, heneicosyl alcohol, behenyl alcohol, lignoceryl alcohol, ceryl alcohol, and montanyl alcohol. In some embodiments, a PCM comprises a combination, mixture, or plurality of differing fatty alcohols.

In some embodiments, a PCM comprises a fatty carbonate ester, sulfonate, or phosphonate. Any fatty carbonate ester, sulfonate, or phosphonate not inconsistent with the objectives of the present invention may be used. In some embodiments, a PCM comprises a C4 to C28 alkyl carbonate ester, sulfonate, or phosphonate. In some embodiments, a PCM comprises a C4 to C28 alkenyl carbonate ester, sulfonate, or phosphonate. In some embodiments, a PCM comprises a combination, mixture, or plurality of differing fatty carbonate esters, sulfonates, or phosphonates. In addition, a fatty carbonate ester described herein can have two alkyl or alkenyl groups described herein or only one alkyl or alkenyl group described herein.

Moreover, in some embodiments, a PCM comprises a paraffin. Any paraffin not inconsistent with the objectives of the present invention may be used. In some embodiments, a PCM comprises n-dodecane, n-tridecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, n-nonacosane, n-triacontane, n-hentriacontane, n-dotriacontane, n-tritriacontane, and/or mixtures thereof.

In addition, in some embodiments, a PCM comprises a polymeric material. Any polymeric material not inconsistent with the objectives of the present invention may be used. Non-limiting examples of suitable polymeric materials for use in some embodiments described herein include thermoplastic polymers (e.g., poly(vinyl ethyl ether), poly(vinyl n-butyl ether) and polychloroprene), polyethylene glycols (e.g., CARBOWAX® polyethylene glycol 4600, CARBOWAX® polyethylene glycol 8000, and CARBOWAX® polyethylene glycol 14,000), and polyolefins (e.g., lightly crosslinked polyethylene and/or high density polyethylene).

Additional non-limiting examples of phase change materials suitable for use in some embodiments described herein include BioPCM materials commercially available from Phase Change Energy Solutions (High Point, N.C.), such as BioPCM-(–8), BioPCM-(–6), BioPCM-(–4), BioPCM-(–2), BioPCM-4, BioPCM-6, BioPCM 0816, BioPCM-Q25, BioPCM-Q30, BioPCM-Q35, BioPCM-Q37, BioPCM-Q42, BioPCM-Q49, BioPCM-55, BioPCM-60, BioPCM-62, BioPCM-65, BioPCM-69, and others.

Further, in some embodiments, a heat exchange apparatus described herein comprises a plurality of differing PCMs. Any mixture or combination of differing PCMs not inconsistent with the objectives of the present invention may be used. In some embodiments, for example, a heat exchange apparatus comprises one or more fatty acids and one or more fatty alcohols. Further, in some embodiments, a plurality of differing PCMs is selected based on a desired phase transition temperature and/or latent heat of the mixture of PCMs. A phase transition temperature of a PCM or mixture of PCMs, in some embodiments, is between about –50° C. and about 90° C. at 1 atm, between about –20° C. and about 90° C. at 1 atm, or between about –20° C. and about 80° C. at 1 atm. In some embodiments, a phase transition temperature is between about –50° C. and about 0° C. at 1 atm or between about –20° C. and about 0° C. at 1 atm. In some embodiments, a phase transition temperature is between about 0° C. and about 20° C. at 1 atm or between about 0° C. and about 10° C. at 1 atm. In some embodiments, a phase transition temperature is between about 5° C. and about 10° C. at 1 atm. In other embodiments, a phase transition temperature is between about 30° C. and about 90° C. at 1 atm or between about 50° C. and about 70° C. at 1 atm. In some embodiments, a phase transition temperature is between about 55° C. and about 65° C. at 1 atm.

Moreover, in some embodiments, a PCM or mixture of PCMs has a phase transition enthalpy of at least about 100 kJ/kg. In other embodiments, a PCM or mixture of PCMs has a phase transition enthalpy of at least about 150 kJ/kg, at least about 200 kJ/kg, or at least about 300 kJ/kg. In some embodiments, a PCM or mixture of PCMs has a phase transition enthalpy between about 100 kJ/kg and about 220 kJ/kg or between about 100 kJ/kg and about 250 kJ/kg. Therefore, in some embodiments, a thermal energy storage system described herein can provide a thermal storage capacity of more than about 1,000,000 British thermal units (Btu) or more than about 300 kilowatt-hours (kWh). In some embodiments, a system can provide a thermal storage capacity of more than about 2,000,000 Btu or more than about 600 kWh. In some embodiments, a system can provide a storage thermal capacity of up to about 2,500,000 Btu or up to about 750 kWh. The thermal storage capacity of a system described herein, in some embodiments, can be varied as desired by altering the identity and/or the amount of the PCM or mixture of PCMs.

Further, in some embodiments, one or more properties of a PCM described herein can be modified by the inclusion of one or more additives. An additive described herein can be mixed with a PCM and/or disposed in the tank of a heat exchange apparatus described herein. In some embodiments, an additive comprises a thermal conductivity modulator. A thermal conductivity modulator, in some embodiments, increases the thermal conductivity of the PCM. In some embodiments, a thermal conductivity modulator comprises carbon, including graphitic carbon. In some embodiments, a thermal conductivity modulator comprises carbon black and/or carbon nanoparticles. Carbon nanoparticles, in some embodiments, comprise carbon nanotubes and/or fullerenes. In some embodiments, a thermal conductivity modulator comprises a graphitic matrix structure. In other embodiments, a thermal conductivity modulator comprises an ionic liquid. In some embodiments, a thermal conductivity modulator comprises a metal, including a pure metal or a combination, mixture, or alloy of metals. Any metal not inconsistent with the objectives of the present invention may be used. In some embodiments, a metal comprises a transition metal, such as silver or copper. In some embodiments, a metal comprises an element from Group 13 or Group 14 of the periodic table. In some embodiments, a metal comprises aluminum. In some embodiments, a thermal conductivity modulator comprises a metallic filler dispersed within a matrix formed by the PCM. In some embodiments, a thermal conductivity modulator comprises a metal matrix structure or cage-like structure, a metal tube, a metal plate, and/or metal shavings. Further, in some embodiments, a thermal conductivity modulator comprises a metal oxide. Any metal oxide not inconsistent with the objectives of the present invention may be used. In some embodiments, a metal oxide comprises a transition metal oxide. In some embodiments, a metal oxide comprises alumina.

In other embodiments, an additive comprises a nucleating agent. A nucleating agent, in some embodiments, can help avoid subcooling, particularly for PCMs comprising finely distributed phases, such as fatty alcohols, paraffinic alcohols, amines, and paraffins. Any nucleating agent not inconsistent with the objectives of the present invention may be used.

A thermal energy storage system described herein, in some embodiments, also comprises a thermally insulating material disposed in the interior of the container and surrounding the exterior of the tank. Any thermally insulating material not inconsistent with the objectives of the present invention may be used. In some embodiments, for instance, the thermally insulating material comprises blown insulation or spray foam insulation. In some embodiments, the thermally insulating material comprises an aerogel.

In addition, in some embodiments, a thermal energy storage system described herein further comprises an energy-producing apparatus. Any energy-producing apparatus not inconsistent with the objectives of the present invention may be used. In some embodiments, an energy-producing apparatus comprises a photovoltaic apparatus, thermal-solar apparatus, or geothermal apparatus. Energy produced by an energy-producing apparatus described herein can be used by the thermal energy storage system in any manner not inconsistent with the objectives of the present invention. In some embodiments, for instance, the energy produced is used directly to heat or cool a PCM of the system. In other embodiments, the energy produced is provided to a battery or an external power grid connected to the thermal energy storage system to at least partially offset the energy consumed by operation of the thermal energy storage system.

It is to be understood that the various components of a thermal energy storage system described herein can be combined in any manner or combination not inconsistent with the objectives of the present invention. For example, a thermal energy storage system can comprise any container described herein in combination with any tank described herein in combination with any manifold described herein in combination with any PCM described herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A thermal energy storage system comprising:
   a container; and
   a heat exchange apparatus disposed within the container, the heat exchange apparatus comprising a tank, a manifold at least partially disposed within the tank, and a phase change material disposed within the tank and in thermal contact with the manifold,
   wherein the container comprises a divider wall separating an active interior region of the container from a user-accessible interior region of the container, the active interior region containing the tank and a portion of the manifold, and the user-accessible interior region providing access to the manifold via an inlet connector and an outlet connector of the manifold that pass through the divider wall.

2. The system of claim 1, wherein the container comprises an outer lining comprising a second phase change material, the outer lining surrounding the exterior of the tank.

3. The system of claim 1, wherein the container comprises a plurality of tank supports formed from a thermally insulating material, and wherein the tank is disposed on the tank supports and supported above the floor of the container.

4. The system of claim 1 further comprising a thermally insulating material disposed within the container and surrounding the exterior of the tank.

5. The system of claim 4, wherein the thermally insulating material comprises blown insulation, spray foam insulation, or an aerogel.

6. The system of claim 1, wherein the manifold comprises a plurality of pipe segments coupled to a plurality of thermal transfer discs, the thermal transfer discs being disposed within the interior volume of the tank and the pipe segments being partially disposed within the interior volume of the tank.

7. The system of claim 1, wherein the manifold has a plate heat exchanger construction.

8. The system of claim 1, wherein the manifold has a plate-fin heat exchanger construction.

9. The system of claim 1, wherein the manifold is adapted to selectively provide a plurality of differing flow paths for a fluid within the manifold, the plurality of differing flow paths having different lengths and/or residence times of the fluid within the tank.

10. The system of claim 1, wherein the manifold contains a fluid.

11. The system of claim 1, wherein the phase change material occupies a continuous interior volume of the tank around the manifold.

12. The system of claim 11, wherein the phase change material occupies about 50 volume percent to about 90 volume percent of the interior volume of the tank and the manifold occupies 10 volume percent to 50 volume percent of the interior volume of the tank.

13. The system of claim 1, wherein the phase change material comprises an additive comprising a nucleating agent and/or an additive comprising a thermal conductivity modulator, wherein the thermal conductivity modulator increases the thermal conductivity of the phase change material.

14. The system of claim 1 further comprising an energy-producing apparatus.

15. The system of claim 14, wherein the energy-producing apparatus comprises a photovoltaic apparatus, thermal-solar apparatus, or geothermal apparatus.

16. The system of claim 14, wherein the energy-producing apparatus is adapted to directly heat or cool the phase change material.

17. The system of claim 14, wherein the energy-producing apparatus is adapted to provide energy to a battery or external power grid connected to the thermal energy storage system.

* * * * *